United States Patent
Gerou et al.

(10) Patent No.: US 12,496,750 B2
(45) Date of Patent: Dec. 16, 2025

(54) COMPRESSION MOLDED DOUBLE WALL BLOCKS FOR A PALLET AND ASSOCIATED METHODS

(71) Applicant: CHEP Technology Pty Limited, Sydney (AU)

(72) Inventors: Christopher John Gerou, Orlando, FL (US); Dwight Bryan Whitfield, Sr., Whigham, GA (US)

(73) Assignee: CHEP Technology Pty Limited, Sydney (AU)

( * ) Notice: Subject to any disclaimer, the term of this patent is extended or adjusted under 35 U.S.C. 154(b) by 448 days.

(21) Appl. No.: 17/820,598

(22) Filed: Aug. 18, 2022

(65) Prior Publication Data

US 2023/0060125 A1 Mar. 2, 2023

Related U.S. Application Data

(60) Provisional application No. 63/239,501, filed on Sep. 1, 2021.

(51) Int. Cl.
*B29C 43/08* (2006.01)
*B29C 33/04* (2006.01)
(Continued)

(52) U.S. Cl.
CPC .............. *B29C 43/08* (2013.01); *B29C 33/04* (2013.01); *B29C 37/0007* (2013.01);
(Continued)

(58) Field of Classification Search
CPC ......... B28B 3/021; B28B 3/04; B28B 7/0064; B28B 13/028; B28B 13/026;
(Continued)

(56) References Cited

U.S. PATENT DOCUMENTS 9,776,762 B2   10/2017 De Beer et al.
10,023,354 B2   7/2018 De Beer et al.
(Continued)

FOREIGN PATENT DOCUMENTS

CN   211492539 U   9/2020
EP   2774750 B1   11/2018
(Continued)

OTHER PUBLICATIONS

International Search Report and Written Opinion for Patent Cooperation Treaty Application No. PCT/US2022/075619, dated Oct. 20, 2023, 12 pages.
(Continued)

*Primary Examiner* — Michael A Tolin
*Assistant Examiner* — Hana C Page
(74) *Attorney, Agent, or Firm* — Alston & Bird LLP

(57) ABSTRACT

A compression molding system includes a first extruder to output melted plastic, and a second extruder downstream from the first extruder to mix the melted plastic with wood chips to output a composite material. A transfer valve alternately directs the composite material between inner block molds and outer block molds. Each inner block mold has an inner block press associated therewith to press the composite material into a desired shape of an inner block having an opening on one side. Each outer block mold has an outer block press associated therewith to press the composite material into a desired shape of an outer block having an opening on one side. A press assembly presses one of the inner blocks into the opening in one of the outer blocks to form a double wall block.

19 Claims, 18 Drawing Sheets

(51) Int. Cl.
  *B29C 37/00* (2006.01)
  *B29C 43/00* (2006.01)
  *B29C 43/36* (2006.01)
  *B29C 43/38* (2006.01)
  *B29C 43/50* (2006.01)
  *B29C 43/52* (2006.01)
  *B29C 43/58* (2006.01)
  *B29L 31/00* (2006.01)

(52) U.S. Cl.
  CPC ............ *B29C 43/003* (2013.01); *B29C 43/38* (2013.01); *B29C 2043/3615* (2013.01); *B29C 2043/5061* (2013.01); *B29C 2043/527* (2013.01); *B29C 2043/5808* (2013.01); *B29L 2031/7722* (2013.01)

(58) Field of Classification Search
  CPC ............ B65D 19/0048; B29C 48/0255; B29C 48/025; B29C 31/042; B29C 48/49; B29C 48/70; B29C 43/146; B29C 48/501
  See application file for complete search history.

(56) References Cited

U.S. PATENT DOCUMENTS

| | | |
|---|---|---|
| 2004/0216859 A1 | 11/2004 | Hamilton |
| 2006/0065992 A1* | 3/2006 | Hutchinson ......... B29C 45/1646 264/320 |
| 2006/0073319 A1 | 4/2006 | Roberson |
| 2007/0042074 A1* | 2/2007 | Graetz ............ B29C 49/4205 425/534 |
| 2009/0196948 A1 | 8/2009 | Mattice et al. |
| 2017/0190463 A1 | 7/2017 | De Beer |
| 2018/0290353 A1* | 10/2018 | Oono ................. B29C 45/28 |
| 2021/0070003 A1 | 3/2021 | Groneberg |

FOREIGN PATENT DOCUMENTS

| | | |
|---|---|---|
| JP | 5530901 A | 3/1980 |
| JP | 03084115 | 8/1991 |
| JP | 2007050663 A | 3/2007 |
| JP | 2012056297 A | 3/2012 |

OTHER PUBLICATIONS

Supplementary Partial European Search Report for Application No. 22865716, dated Jun. 11, 2025, 3 pages.

Japanese Office Action for Application No. 2024-513923, dated Jan. 21, 2025, 30 pages.

Supplementary European Search Report for Application No. 22865716, dated Sep. 24, 2025, 4 pages.

\* cited by examiner

COMPRESSION MOLDED DOUBLE WALL BLOCKS FOR A PALLET AND ASSOCIATED METHODS

RELATED APPLICATION

This application claims the benefit of U.S. provisional application Ser. No. 63/239,501 filed Sep. 1, 2021, which is hereby incorporated herein in its entirety by reference.

TECHNICAL FIELD

The present disclosure relates to the field of pallets, and more particularly, to double wall blocks for a pallet and related methods for making the same.

BACKGROUND

Conventional pallets are typically made of wood and include a bottom deck and a top deck separated by support blocks. The support blocks form a gap between the bottom and top decks for receiving a lifting member, such as tines from a forklift or pallet jack.

The top deck is typically multiple layers where end deck boards are assembled on connector boards that run the full length or width of the pallet. The end deck boards are nailed through the connector boards into the support blocks to build the primary structure of the pallet. The end deck boards are also known as lead boards. Intermediate deck boards are placed between the end deck boards. The base layer is typically a single layer where the end deck boards do not overlap connector boards.

To move the pallet with cargo thereon, the tines from a forklift or pallet jack are inserted into the gaps between the bottom and top decks. Depending on the operator of the forklift or pallet jack, the tines may make contact with the support blocks during alignment with the gaps. If the force is significant, the support blocks may be damaged.

The support blocks are generally solid wood. Solid wood support blocks provide good strength and durability. Depending on their size, solid wood support blocks can be heavy which adds to the final weight of the pallet. The cost of each solid wood support block is typically based on its volume and the type of wood used.

SUMMARY

A compression molding system includes a first extruder to output melted plastic, and a second extruder downstream from the first extruder and configured to mix the melted plastic with wood chips to output a composite material. A transfer valve is downstream from the second extruder to alternately direct the composite material between an inner block output and an outer block output associated with the transfer valve.

At least one inner block assembly includes at least one inner block mold to receive the composite material from the inner block output associated with the transfer valve, and at least one inner block press aligned with the at least one inner block mold to press the composite material in the at least one inner block mold into a desired shape of at least one inner block having an opening on one side. At least one outer block assembly includes at least one outer block mold to receive the composite material from the outer block output associated with the transfer valve, and at least one outer block press aligned with the at least one inner block mold to press the composite material in the at least one outer block mold into a desired shape of at least one outer block having an opening on one side.

A press assembly is downstream from the at least one inner and outer block assemblies, and presses one of the at least one inner blocks into the opening in one of the at least one outer blocks to form a double wall block.

The compression molding system may further include an inner block carousel and an outer block carousel. The at least one inner block assembly may include a plurality of inner block assemblies spaced apart on the inner block carousel. The at least one outer block assembly may include a plurality of outer block assemblies spaced apart on the outer block carousel. The inner and outer block carousels are configured to rotate, with the composite material alternately being deposited into the at least one inner and outer block molds as they become available on their respective inner and outer block carousels.

The compression molding system may further include an inner block coolant system and an outer block coolant system. The inner block coolant system circulate a coolant through each inner block mold when the composite material therein is under pressure by the at least one inner block press associated therewith. The outer block coolant system circulates a coolant through each outer block mold when the composite material therein is under pressure by the at least one outer block press associated therewith.

The inner and outer block molds may be cooled while under pressure to allow the composite material to stabilize in order for the inner and outer blocks to be removed from their respective inner and outer block molds without being soft and sagging.

The compression molding system may further include a robot arm positioned between the inner and outer block mold assemblies, and is configured to alternately grab the at least one inner block and the at least one outer block as they exit the at least one inner and outer block molds. An inner block conveyor is positioned between the robot arm and the press assembly to receive the at least one inner block from the robot arm. An outer block conveyor is adjacent the inner block conveyor and is positioned between the robot arm and the press assembly to receive the at least one outer block from the robot arm. The press assembly may receive the at least one inner block and the at least one outer block from the inner and outer block conveyors.

The compression molding system may further comprising a first chilled sprayer adjacent the inner and outer block conveyors, and configured to cool the at least one inner and outer blocks as they travel on the respective inner and outer block conveyors to the press assembly.

The compression molding system may further include a single conveyor to receive the double wall block from the press assembly. A second chilled sprayer may be adjacent the single conveyor to cool the double wall block as it travels on the single conveyor.

A temperature of the outer block in the double wall block may be warmer than a temperature of the inner block in the double wall block, and as the outer block cools, the outer block shrinks onto the inner block to create a tight seal at an interface between the inner and outer blocks.

The composite material may be about 50% plastic and about 50% wood. The double wall block may be formed with a hollow center. The inner block may be configured as a 5-sided block with the opening on a remaining side, and the outer block may be configured as a 5-sided block with the opening on a remaining side. The inner and outer blocks may be oriented so that the opening of the inner block is facing the opening of the outer block.

Yet another aspect is directed to a compression press including a frame, a movable lid carried by the frame and having an opening extending therethrough, and an enclosure carried by the frame that includes a core movable between a retracted position and an extended position. The core is aligned with the opening in the lid.

A first hydraulic stage is carried by the frame and is configured to move the core from the retracted position to the extended position, with the core in the extended position extending through the opening in the lid, and move the lid and the core in the extended position to contact a mold having a cavity with material deposited therein. Pressure is applied to the lid and the core in the extended position within the cavity causing the material to spread out and form an object having a desired shape within the mold. A second hydraulic stage is carried by the frame and is configured to apply additional pressure on the lid and the core in the extended position within the cavity.

Other aspects are directed to a method of operating the compression molding system as described above, and to a method of operating the compression press as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
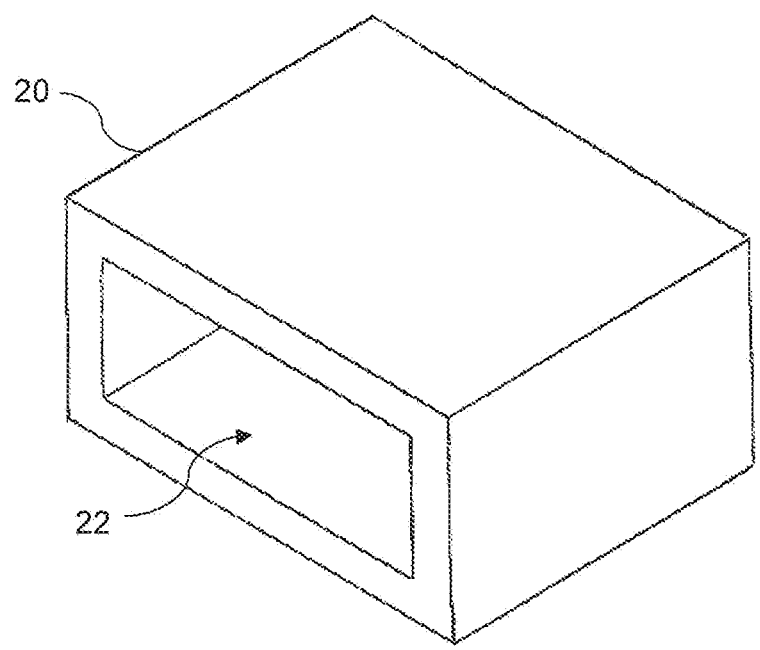
FIG. 1 is a perspective view of a compression molded inner block in accordance with the present disclosure.
Figure 2:
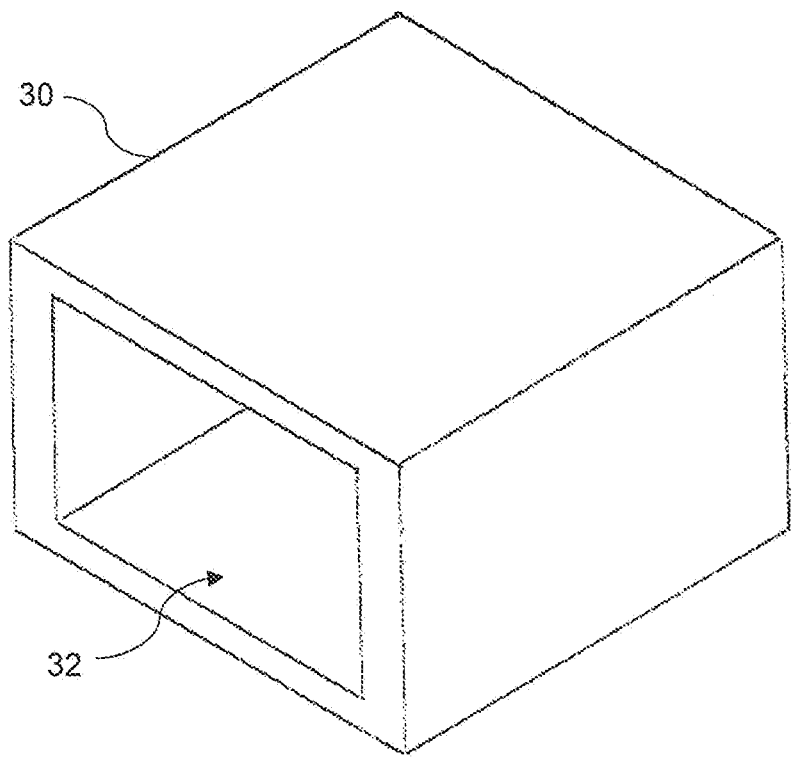
FIG. 2 is a perspective view of a compression molded outer block in accordance with the present disclosure.
Figure 3:
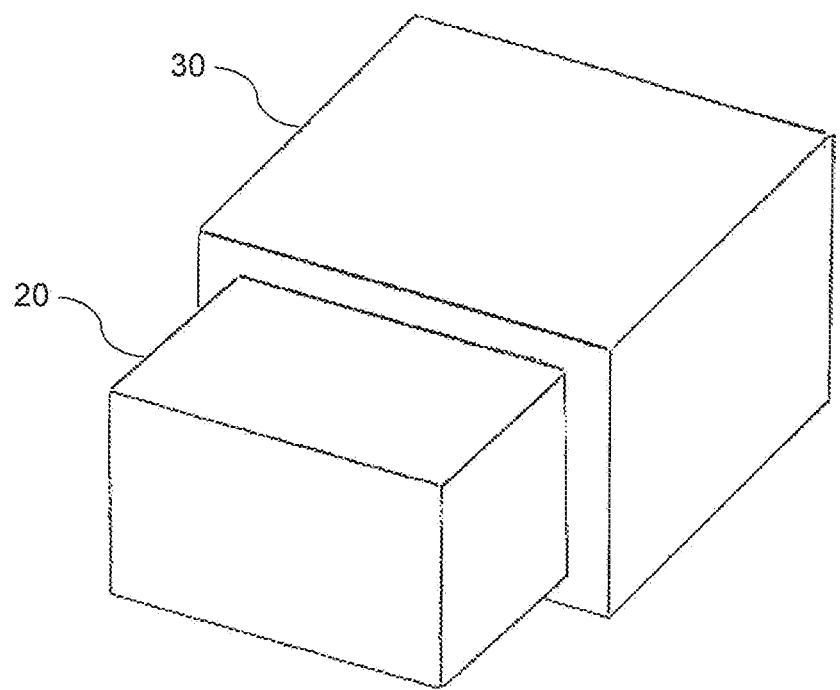
FIGS. 3 and 4 are perspective views of the compression molded inner and outer blocks illustrated in FIGS. 1 and 2 being aligned and pushed together to form a double wall block.
Figure 4:
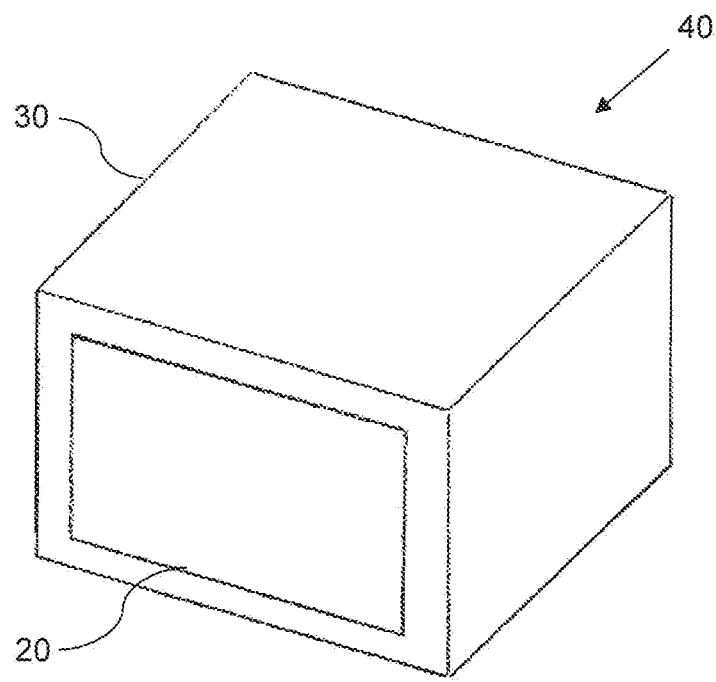

Referring initially to FIGS. 1 and 2, and as will be discussed in greater detail below, compression molding is used to form inner and outer blocks 20, 30 for use with pallets. The inner block 20 is a 5-sided block with an opening 22 on the remaining side. Likewise, the outer block 30 is a 5-sided block with an opening 32 on the remaining side. Shortly after the inner and outer blocks 20, 30 are formed, the inner block 20 is inserted into the opening 32 of the outer block 30 to form a compression molded double wall block 40, as illustrated in FIGS. 3 and 4. The compression molded double wall block 40 may also be referred to as a double wall block or as a support block.

Depending on the orientation of the inner block 20, the double wall block will have 4 or 5 sides that have double walls. A double wall block with 5 sides occurs when the inner block is placed into the outer block such that the cavity of the inner block is exposed. The side opposite the opening would be the $5^{th}$ double wall. A pallet with double wall blocks 40 having a hollow center reduces the weight of the pallet as compared to the use of solid wood blocks while also providing durability and strength.

Figure 5:
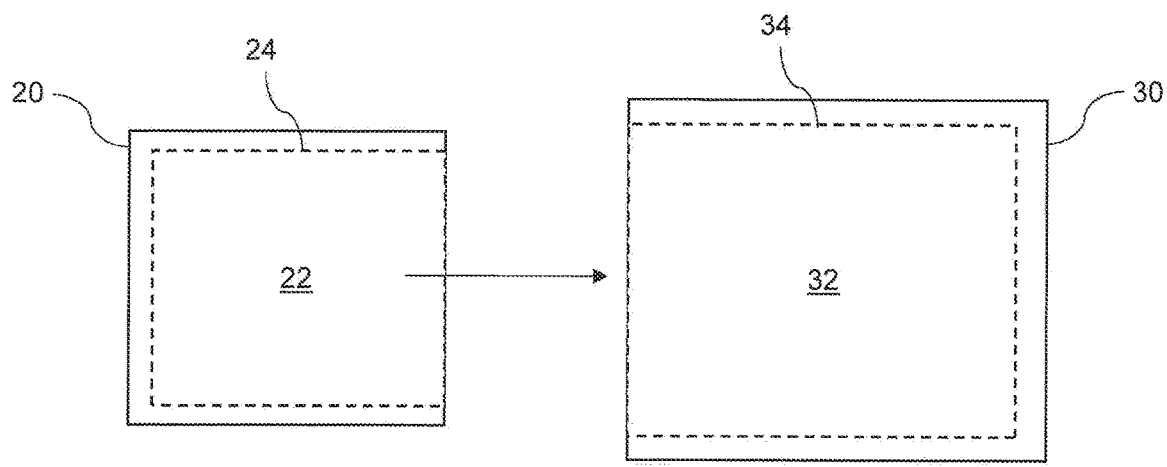
FIGS. 5 and 6 are cross-sectional side views of the compression molded inner and outer blocks illustrated in FIGS. 1 and 2 being aligned and pushed together to form a double wall block.

In one configuration, the inner and outer blocks 20, 30 may be oriented such that the opening 22 of the inner block 20 is facing the opening 32 of the outer block 30, as illustrated in FIG. 5. The side views of the inner and outer blocks 20, 30 include dashed lines 24, 34 to show wall thicknesses of each respective block. In this configuration, the double wall block 40 has 4 sides having double walls.

Figure 6:
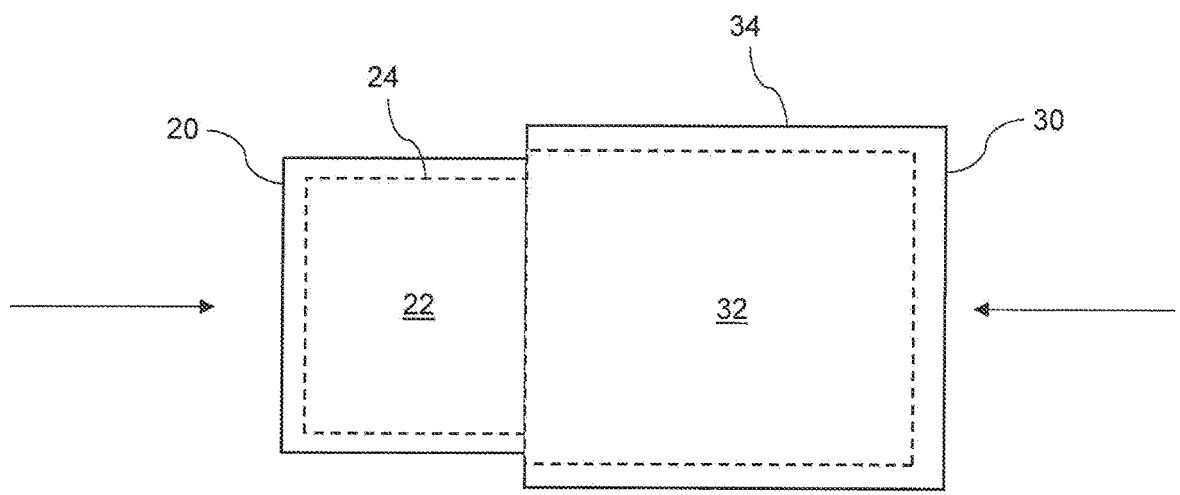
Figure 7:
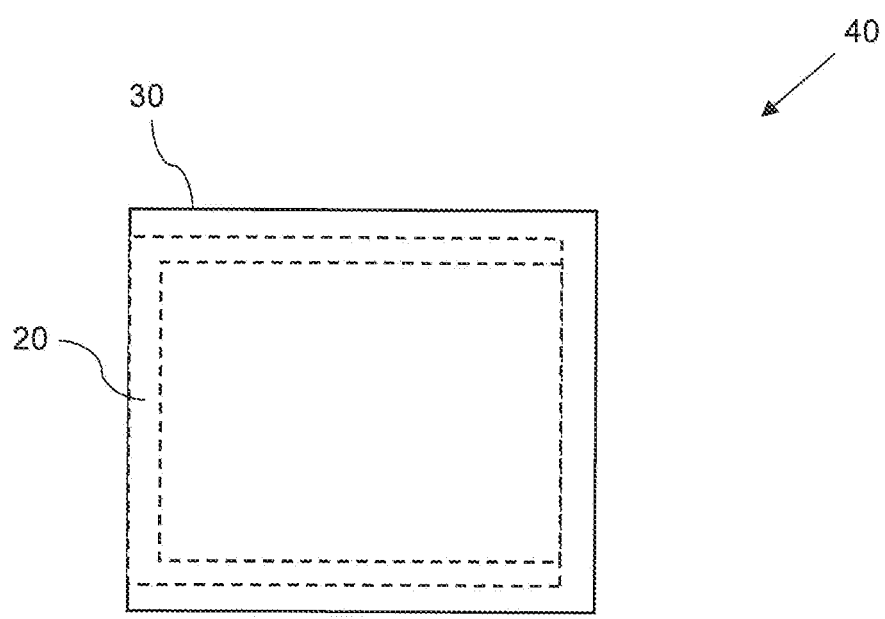
FIG. 7 is a cross-sectional side view of the double wall block illustrated in FIG. 4.

Soon after the inner and outer blocks 20, 30 have been formed, and as they are cooling, the inner block 20 is inserted into the opening 32 of the outer block 30 to form the double wall block 40, as illustrated in FIG. 6. As will be discussed in greater detail below, the inner block 20 is pre-cooled before being inserted into the warmer outer block 30. After the double wall block 40 has been formed, a chilled spray continues to cool the warmer outer block 30 so that the outer block 30 shrinks onto the inner block 20 while creating a hermetic seal.

In other configurations, orientation of the inner block 20 may be rotated 90 or 180 degrees before being inserted into the opening 32 of the outer support block 30. This allows the double wall block 40 to have 5 sides having double walls so as to provide increased durability.

Figure 8:
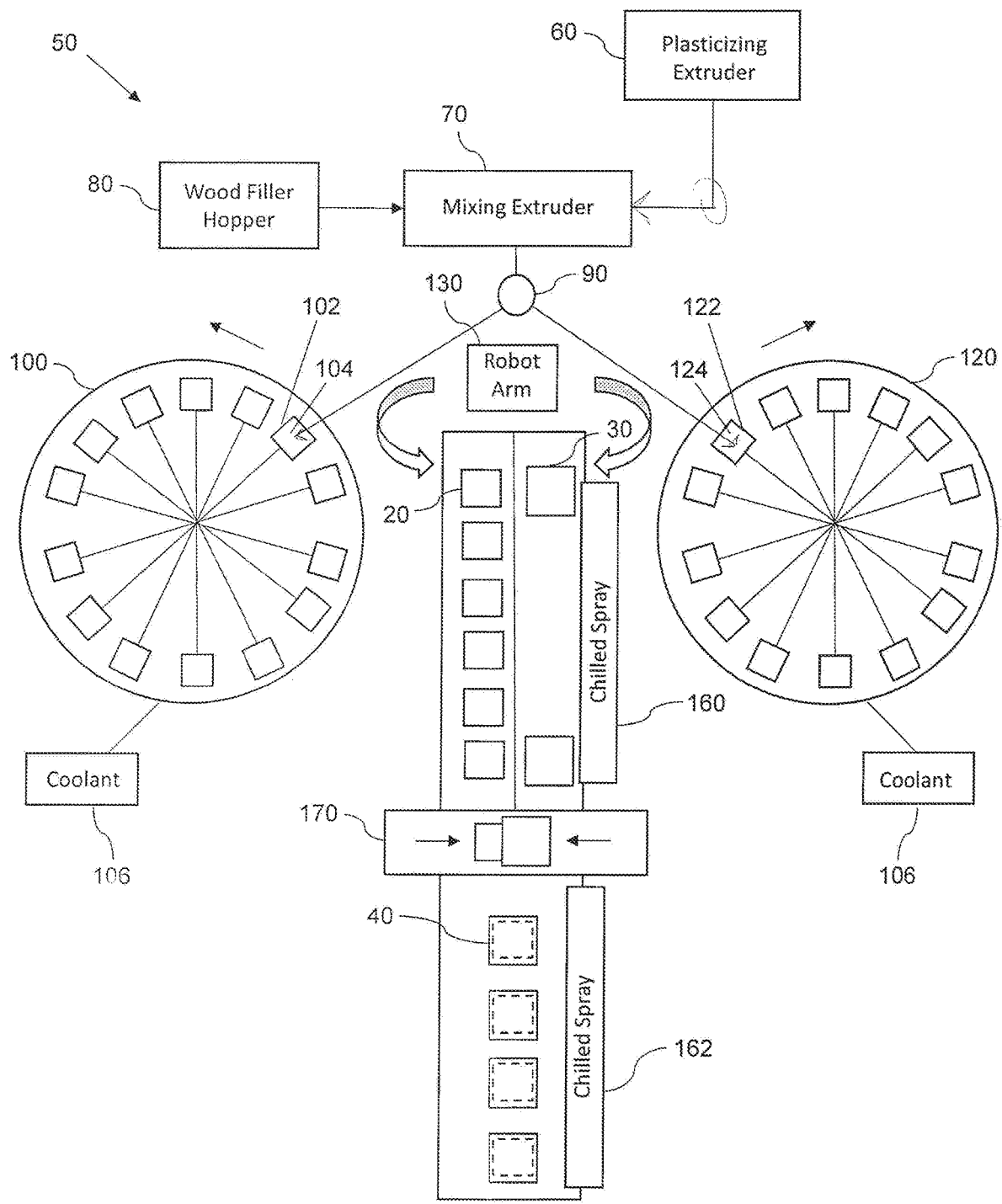
FIG. 8 is a block diagram of a compression molding system for forming the compression molded inner and outer blocks illustrated in FIGS. 1 and 2.

A compression molding system 50 used to form the double wall blocks 40 will now be discussed in reference to FIG. 8. The compression molding system 50 includes a pair of extruders. A first extruder is a plasticizing extruder 60 that receives recycled thermal plastic and melts the plastic. Recycled thermal plastic is cost effective, but as an alternative, non-recycled (i.e., virgin) thermal plastic may be used. The melted plastic is then transferred to a second extruder, which is a mixing extruder 70. The mixing extruder 70 mixes the melted plastic with wood chips received from a wood filler hopper 80 to form a composite material. An output of the mixing extruder 70 directs the composite material to a transfer valve 90.

There is an advantage of plasticizing the recycled thermal plastic before adding the wood chips. The problem of plasticizing the recycled thermal plastic and wood chips at the same time is that the temperature needed to plasticize the recycled thermal plastic causes the wood chips to burn. A temperature of about 370 EF is needed to melt the plastic.

When the wood chips are added before the plastic is melted, the wood chips reduce the efficiency of the extruder.

In the mixing extruder 70, the wood chips are added to the melted plastic before entering a compression section of the mixing extruder 70. The wood chips now act as a coolant to cool the temperature of the melted plastic to a temperature that is ideal for compression molding. The temperature of the melted plastic is reduced from about 370 EF to about 300 EF. At this reduced temperature the composite material has been mixed with fully wetted wood fibers glued together at a temperature that has not started to gas.

Two carousels 100, 120 are used to allow for a continuous compression molding process. An inner block carousel 100 is for the inner blocks 20, and an outer block carousel 120 is for the outer blocks 30. The transfer value 90 alternately directs the composite material between an inner block output associated with the transfer value 90 for the inner block molds 102 on the inner block carousel 100, and an outer block output associated with the transfer value 90 for the outer block molds 122 on the outer block carousel 120.

The inner block carousel 100 includes a plurality of inner block assemblies spaced apart on the inner block carousel. As will be described in greater detail below, each inner block assembly includes at least one inner block mold 102 to receive the composite material from the inner block output associated with the transfer valve 90, and at least one inner block press aligned with the at least one inner block mold 102. The at least one inner block press is configured to press the composite material in the at least one inner block mold 102 into a desired shape of at least one inner block 20 having an opening 22 on one side.

Similarly, the outer block carousel 120 includes a plurality of outer block assemblies spaced apart on the outer block carousel. As will be described in greater detail below, each outer block assembly includes at least one outer block mold 122 to receive the composite material from the outer block output associated with the transfer valve 90, and at least one outer block press aligned with the at least one inner block mold 122. The at least one outer block press is configured to press the composite material in the at least one outer block mold 122 into a desired shape of at least one outer block 30 having an opening 32 on one side.

As the inner block carousel 100 rotates and an inner block mold 102 becomes available, the transfer value 90 directs a predetermined volume of composite material to be deposited into an inner block mold cavity 104. The inner block mold cavity 104 is then closed using the inner block compression press associated therewith. The inner block compression press drives a floating core into the inner block mold cavity 104. This causes the composite material to flow into the desired shape of the inner block 20.

After the floating core has compressed into the inner block mold cavity 104, the inner block carousel 100 rotates. As the outer block carousel 120 rotates and an outer block mold 122 becomes available, the transfer value 90 directs a predetermined volume of composite material to be deposited into an outer block mold cavity 124. The outer block mold cavity 124 is then closed using the outer block compression press associated therewith. The outer block compression press drives a floating core into the outer block mold cavity 124. This causes the composite material to flow into the desired shape of the outer block 30.

After the core has compressed into the outer block mold cavity 124, the outer block carousel 120 rotates. During rotation, the transfer value 90 directs the predetermined volume of composite material to be deposited into the next available inner block mold cavity 104. Alternating depositing of the composite material into the inner and outer block mold cavities 104, 124 is a continuous process as the inner and outer block molds 102 become available on their respective carousels 100, 120.

The compression molding system 50 is configured to consistently form inner blocks 20 and outer blocks 30. This is based on a number of interdependencies between the materials, the equipment, and the process.

The ratio of plastic to wood used to form the inner and outer blocks may vary. In one example, the composite material from the mixing extruder 70 is about 50% plastic and about 50% wood. The ratio may be balanced to meet a desired nail retention of the double wall blocks. In other examples, the ratio of the wood within the composite material may vary between 30-50%, while the corresponding amount of plastic may vary between 70-50%. These example ratios are for illustration purposes and are not to be limiting.

The temperature of the composite material from the mixing extruder 70 is about 300 EF. This allows for the composite material to have a good mixture with a good consistency that flows well into the respective inner and outer mold cavities 104, 124.

Cooling of the composite material after having been deposited into the inner and outer molds 102, 122 is also a factor. Cooling of the inner and outer molds 102, 122 while under pressure allows the composite material to set up hard enough (i.e., stabilize) in order to get the inner and outer blocks 20, 30 out of their respective molds without being soft and sagging.

The inner block carousel 100 and the outer block carousel 120 are sized based on the coolant 106, 126 to allow sufficient time for the inner and outer blocks 20, 30 to cool as they are rotated. The coolant 106, 126 is chilled water, for example, that is circulated through the inner and outer block molds 102, 122. The number of molds on each carousel is determined by how long it would take for the composite material to cool enough in order for the inner and outer blocks 20, 30 to be removed from their respective molds 102, 122.

In the illustrated compression molding system 50, the inner block carousel 100 has 14 molds 102 and the outer block carousel 120 has 14 molds 122. The molds on each carousel are grouped into 7 stations, with each station having 2 molds. Both of the molds per station are filled with the composite material at the same time.

As the inner block molds 102 are rotated, the floating core from the inner block compression press associated with each inner mold 102 remains in the inner block mold cavity 104. Likewise, as the outer molds 122 are rotated, the floating core from the outer block compression press associated with each mold 122 remains in the outer block mold cavity 124.

After the pair of inner block molds 102 within a station on the inner block carousel 100 reach a certain point within the rotation, the respective floating cores from the compression mold press are removed from the inner block mold cavities 104 which in turn pulls the inner blocks 20 out of the cavities. As the inner blocks 20 cool, they have a tendency to shrink onto the respective cores. Consequently, the inner blocks 20 remain on the respective floating cores as the cores are removed from the inner block mold cavities 104.

A robot arm 130 is positioned between the inner block carousel 100 and the outer block carousel 120. The robot arm 130 is a swinging arm used to grab the pair of inner blocks 20. As the robot arm 130 grabs the pair of inner blocks 20, a stripper plate from the inner block compression press comes down and pushes the inner blocks 20 off of the respective floating cores. The robot arm 130 then places the inner blocks 20 on an inner block conveyor 140.

Similarly, after the pair of outer block molds 122 within a station on the outer block carousel 120 reach a certain point within the rotation, the respective cores from the compression mold press are removed from the outer block mold cavities 124 which in turn pulls the outer blocks 30 out of the cavities. The robot arm 130 is used to grab the pair of outer blocks 30. As the robot arm 130 grabs the pair of outer blocks 30, a stripper plate from the outer block compression press comes down and pushes the outer blocks 30 off of the respective cores. The robot arm 130 then places the outer blocks 30 on an outer block conveyor 150 that is adjacent the inner block conveyor 140.

The inner and outer block conveyors 140, 150 are split since they move at different speeds. The inner block conveyor 140 is slower than the outer block conveyor 150. This allows more time for the inner blocks 20 to cool.

As the inner and outer blocks 20, 30 move down the inner and outer block conveyors 140, 150, they are cooled by a chilled sprayer 160. A press assembly 170 is positioned downstream from the inner and outer block conveyors 140, 150 to receive the inner and outer blocks 20, 30. The press assembly 170 is configured to press the inner block 20 into the opening 32 of the outer block 30 while the outer block 30 is pressed towards the inner block 20.

After the inner and outer blocks 20, 30 have been pressed together to form a double wall block 40, the newly formed double wall block 40 travels down a single conveyor 180. The double wall blocks 40 are further cooled by a chilled sprayer 162. Since the outer block 30 is warmer than inner block 20, and as the outer block 30 cools, it shrinks onto the inner block 20 to create a tight seal at an interface between the inner and outer blocks 20, 30.

Referring now to FIGS. 9-13, the inner and outer block compression presses as discussed above to form the compressed inner and outer blocks 20, 30 will be discussed in greater detail. For discussion purposes, the inner and outer block compression presses will be generally referred to as a compression press 200. The compression press 200 is advantageously configured as a multi-stage compression press and is the same for the inner and outer block molds 102, 122.

Figure 9:
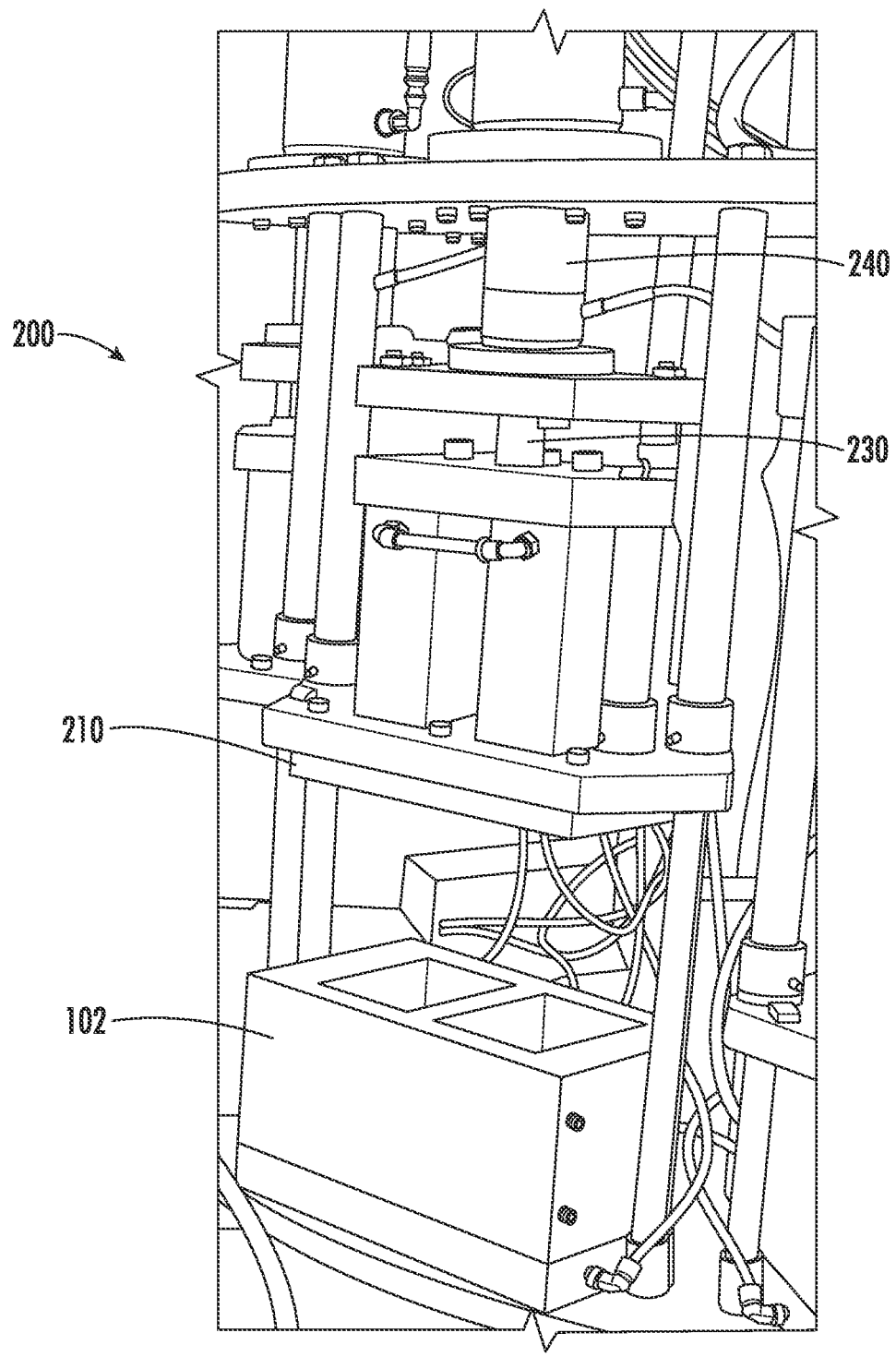
FIGS. 9-13 illustrate operation the multi-stage compression press used to form the inner and outer blocks illustrated in FIGS. 1 and 2.

The compression press 200 includes a first hydraulic stage 230 and a second hydraulic stage 240, as illustrated in FIG. 9. Both hydraulic stages are independently controlled by a hydraulic system 250.

In one embodiment, the first and second hydraulic stages 230, 240 are formed as a single unit, as illustrated. The first and second hydraulic stages 230, 240 share a single cylinder. Alternatively, the first and second hydraulic stages 230, 240 may be formed as separate units such that each stage has their own cylinder.

The inner block mold 102 is sized for a pair of inner blocks 20. Alternatively, the pair of inner blocks 20 may be formed using a pair of side-by-side inner block molds 102, with each inner block mold 102 being sized for a single inner block 20. As noted above, each carousel 100, 120 is divided into stations, with each station used to form a pair of inner blocks 20 or a pair of outer blocks 30.

The compression press 200 includes a frame 211 secured to a base 213. The base 213 may be part of the inner or outer block carousels 100, 120, for example. A movable lid 210 is carried by the frame 211 and has a pair of openings extending therethrough. A pair of enclosures 215 is carried by the frame 211 and includes a pair of cores 220 movable between a retracted position and an extended position. The pair of cores 220 are aligned with the respective openings in the lid 210. The cores 220 may also be referred to as floating cores.

Figure 10:
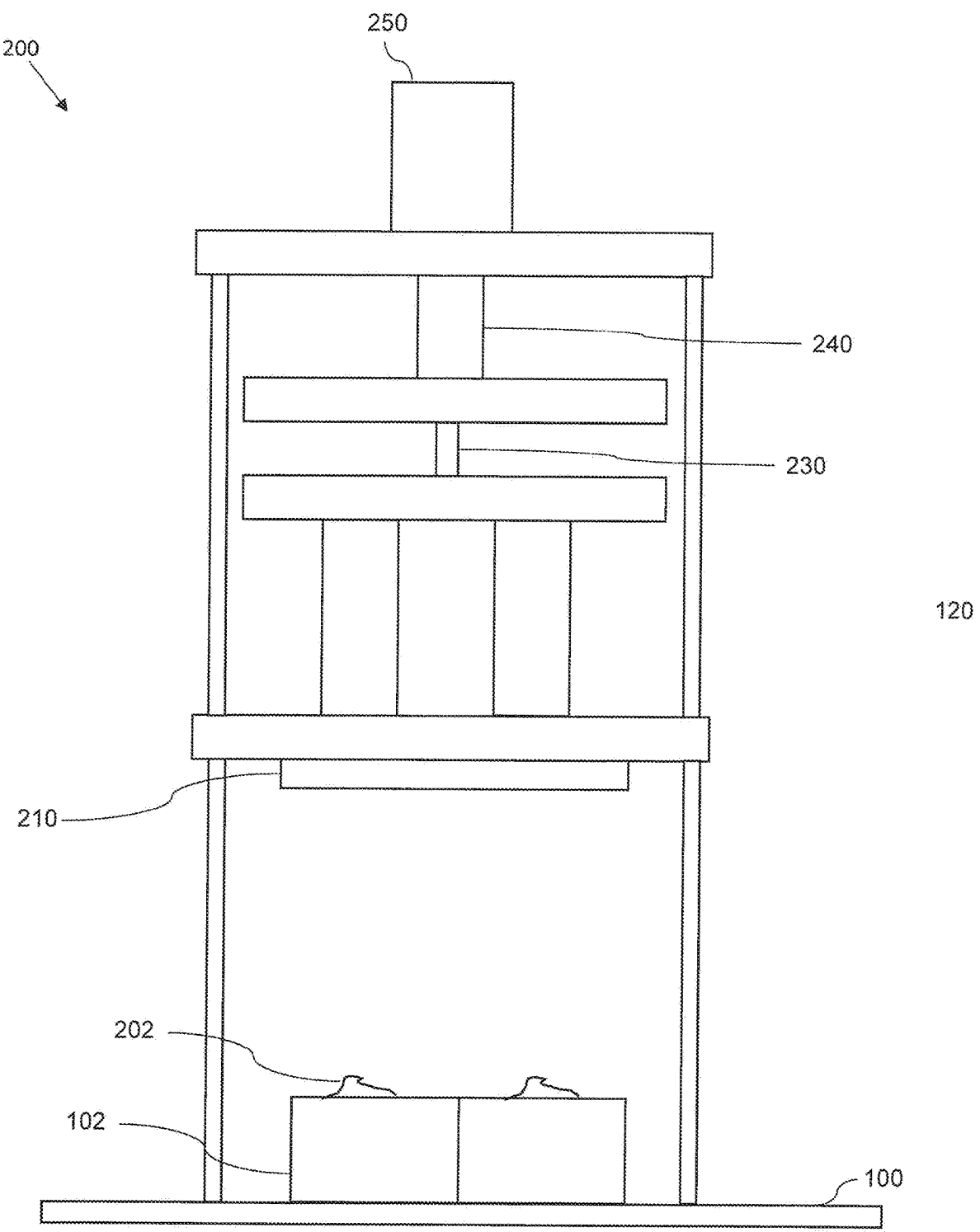
Figure 11:
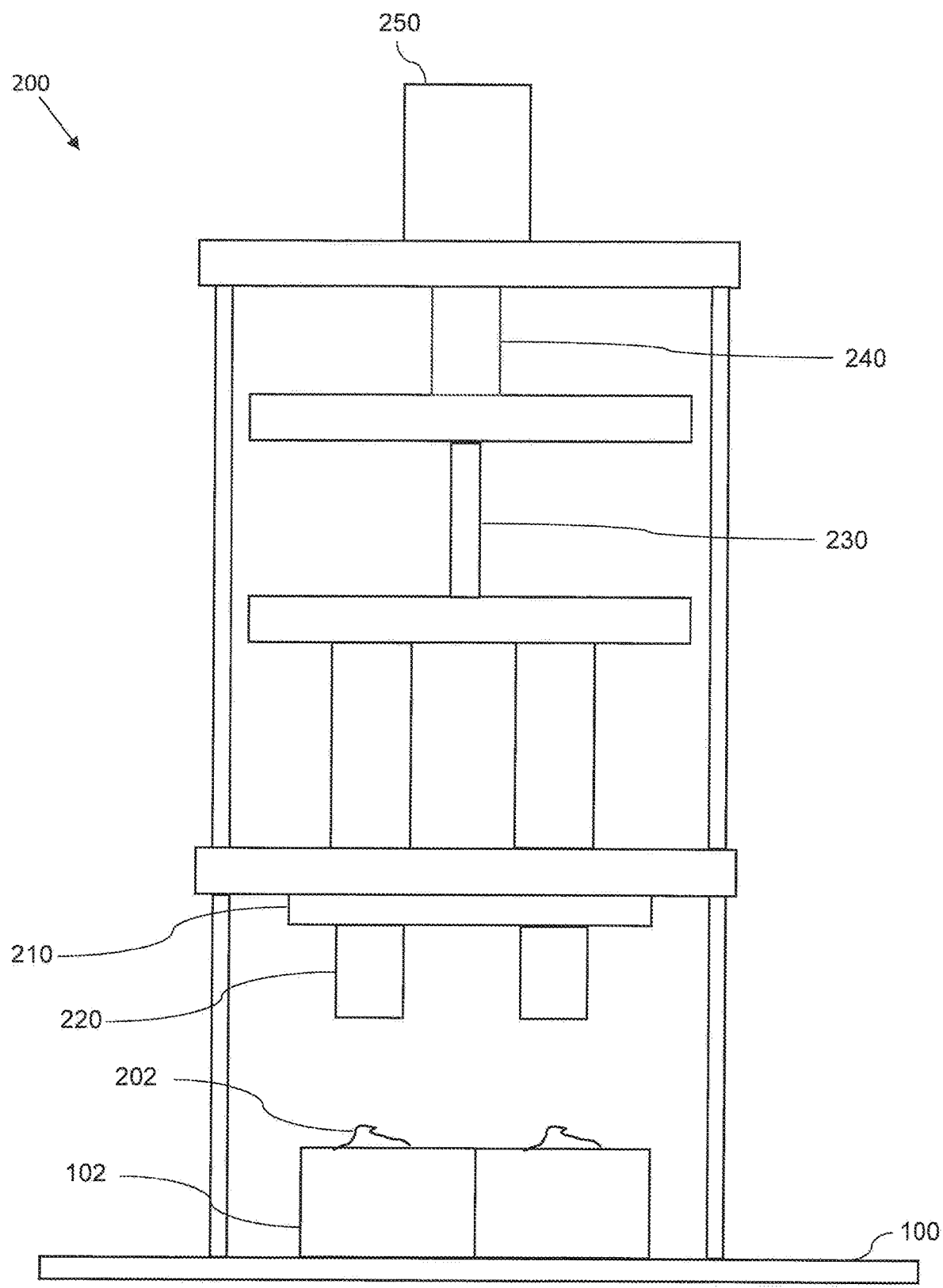

A composite material 202 is then deposited into the cavities 104 of the inner block molds 102, as illustrated in FIG. 10. The first hydraulic stage 230 is carried by the frame 211 and is configured to move the pair of cores 220 from the retracted position to the extended position, as illustrated in FIG. 11. When the pair of cores 220 are in the extended position they extend through the pair of openings in the lid 210.

Figure 12:
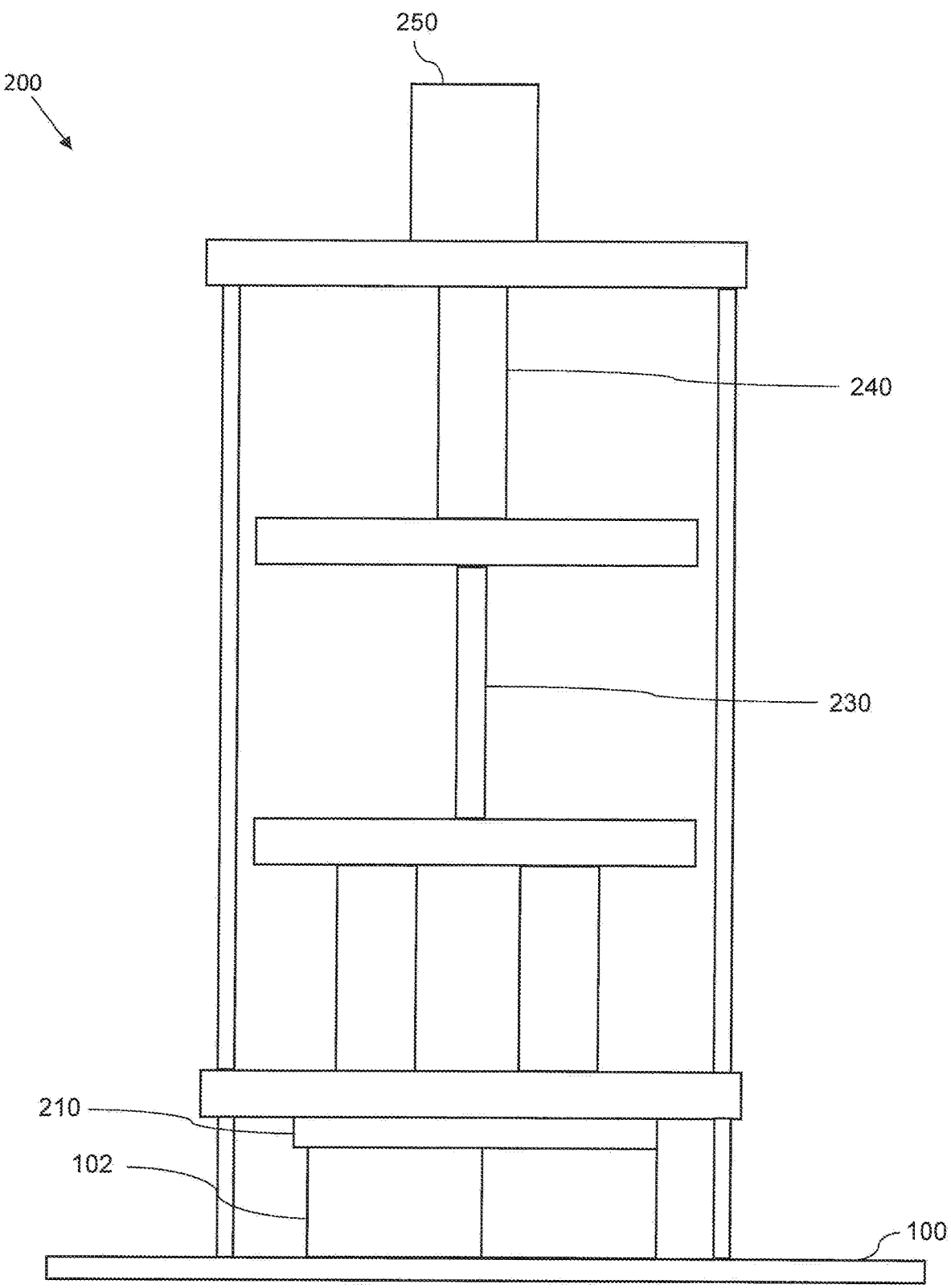

The lid 210 and the pair of cores 220 in the extended position are then moved to contact a pair of molds 102 each having a cavity 104 with the material 202 deposited therein, as illustrated in FIG. 12. Pressure is applied to the lid 210 and the pair of cores 220 in the extended position within the cavities 104 causing the material to spread out and form objects having a desired shape (e.g., inner block 20) within the pair of molds 102. The second hydraulic stage 240 is carried by the frame 211 and is configured to apply additional pressure on the lid 210 and the pair of cores 220 in the extended position within the cavities 104.

After the composite material 202 has been deposited in the respective inner block cavities 104 in the inner block molds 102, the first hydraulic stage 230 extends out or pre-travels the core 220 about halfway past the lid 210 that is used to seal off the inner block cavities 104. The floating cores 220 extend through the lid 210.

The floating cores 220 travel into the inner block cavities 104 with the composite material 202 therein. During this process, the composite material 202 is uniformly spread out in the inner mold cavities 104 so as to prevent flashing of the composite material 202. At this point in the process, the second hydraulic stage 240 continues to press down so that the lid 210 and floating cores 220 remain under pressure with respect to the inner block molds 102.

As the inner blocks 20 within the inner block molds 102 cool down, the inner blocks 20 start to shrink. To prevent this shrinkage, the floating cores 220 are under pressure within the inner block mold cavities 104 and push back. Also, the steel walls forming the inner block mold cavities 104 push back against the composite material 202.

This advantageously allows dimensions of the inner blocks 20 to be nearly equal to the dimensions of the inner block cavities 104. In a typical compression molding process where a single hydraulic stage is used, the part being formed typically shrinks within 5 to 8 percent of the dimensions of the mold. The inner blocks 20 shrink 2 percent or less of the dimensions of the inner block mold cavities 104.

By controlling the shrinkage of the inner blocks 20, the compression molding system 200 is able to tolerate variations in the volume of the composite material 202 deposited into the inner block mold cavities 104. The volume of the composite material 202 may vary up to 15%, for example.

The multi-stage compression press 200 helps to ensure the physical properties of the inner blocks 20. When sufficient shrinkage is introduced in a single-stage compression press, stress lines and other imperfections start to show within the part.

After the first and second hydraulic stages 230, 240 engage the inner block mold 102 with the composite material 202 therein and maintain pressure, the inner block molds 102 are cooled off by coolant 106 as the inner block carousel 100 rotates. In one embodiment, the coolant 106 is chilled water that circulates within the inner block molds 102 adjacent the cavities 104 therein.

Figure 13:
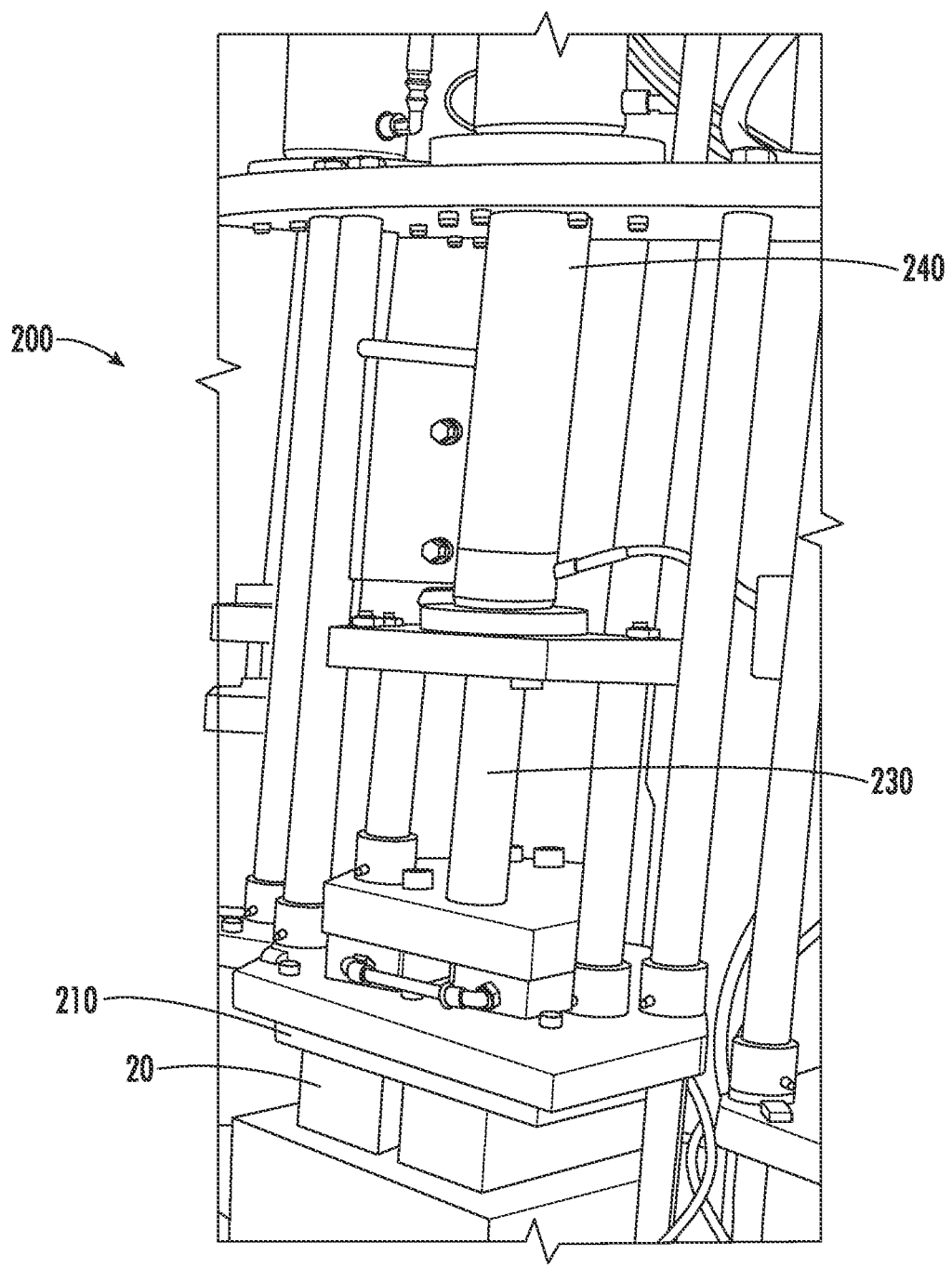

After each inner block mold 102 makes a full rotation on the inner block carousel 100, the inner blocks 20 are to be removed. The first and second hydraulic stages 230, 240 release pressure so as to remove the floating cores 220 from the inner block mold cavities 104, as illustrated in FIG. 13. As the floating cores 220 are removed, so are the inner blocks 20 since they have shrunk onto the floating cores 220.

Figure 14:
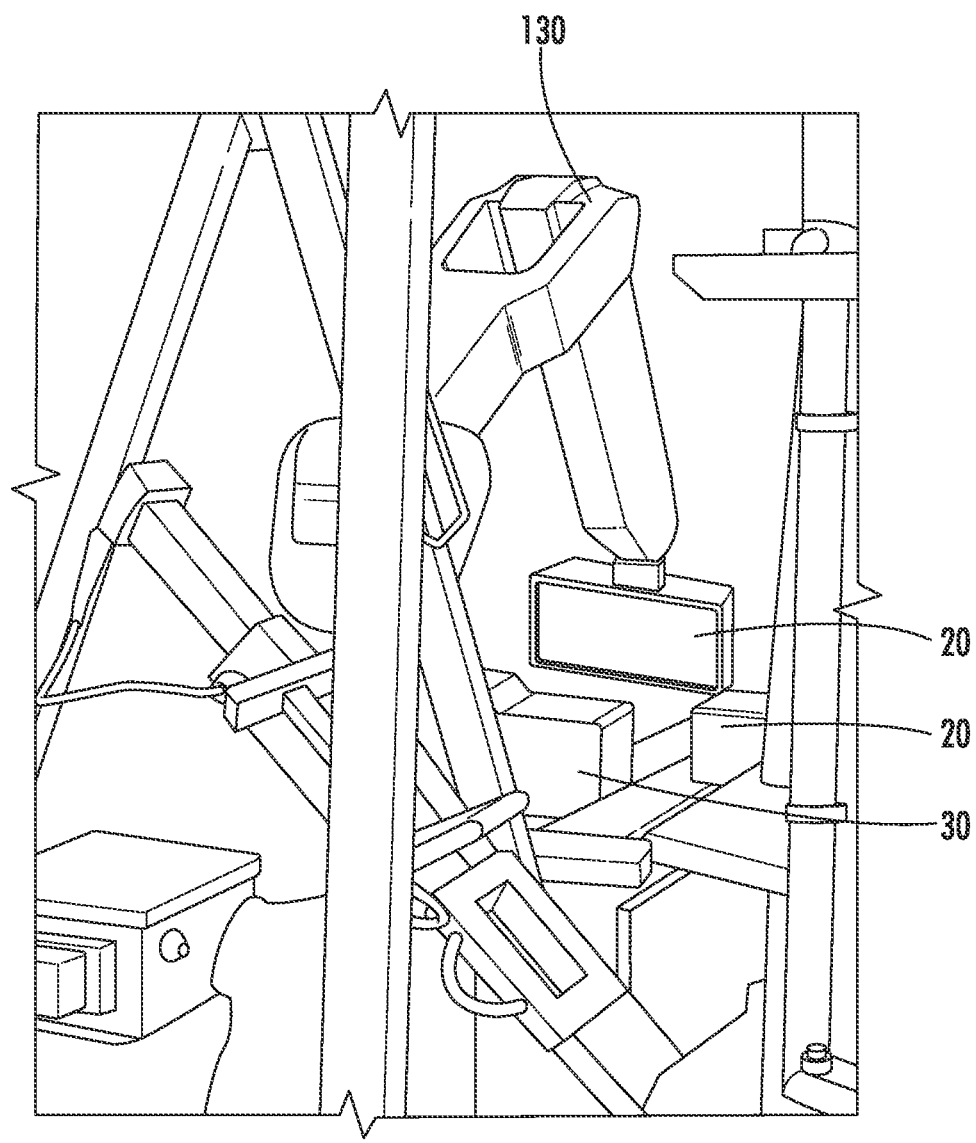
FIG. 14 illustrate operation of the robot arm used to remove the inner blocks from the multi-stage compression press illustrated in FIG. 13.
Figure 15:
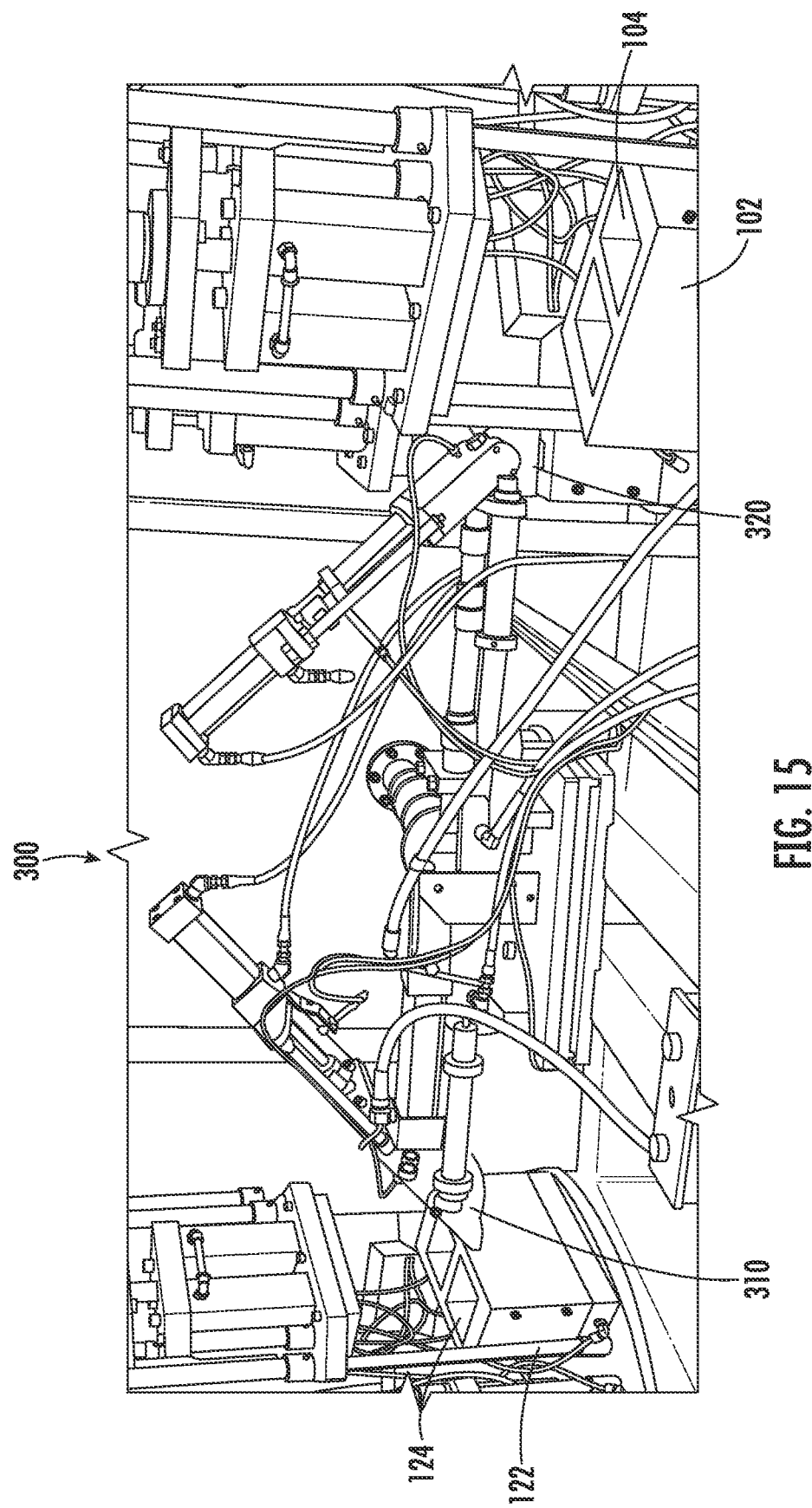
FIGS. 15-18 illustrate operation of how the composite material is deposited into the respective inner and outer block mold cavities.

To remove the inner blocks 20 from the floating cores 220, the lid 210 functions as a stripper plate to disengage the inner blocks 20 from the floating cores 220 so that the floating cores can be fully retracted. Prior to the inner blocks 20 being disengaged by the lid 210, the robot arm 130 grabs the pair of inner blocks and places them on the inner block conveyor 140, as illustrated in FIG. 14.

Referring now to FIGS. 15-18, depositing the composite material into the respective inner and outer block mold cavities 104, 124 will be discussed in greater detail. The transfer value 90 as discussed above operates in coordination with a composite material shuttle 300.

The composite material shuttle 300 shuttles back and forth between the inner block carousel 100 and the outer block carousel 120. The composite material shuttle 300 includes a pair of spaced apart heads 310, 320 to deposit the composite material when needed. The heads 310, 320 may be referred to inner and outer block outputs.

Figure 16:
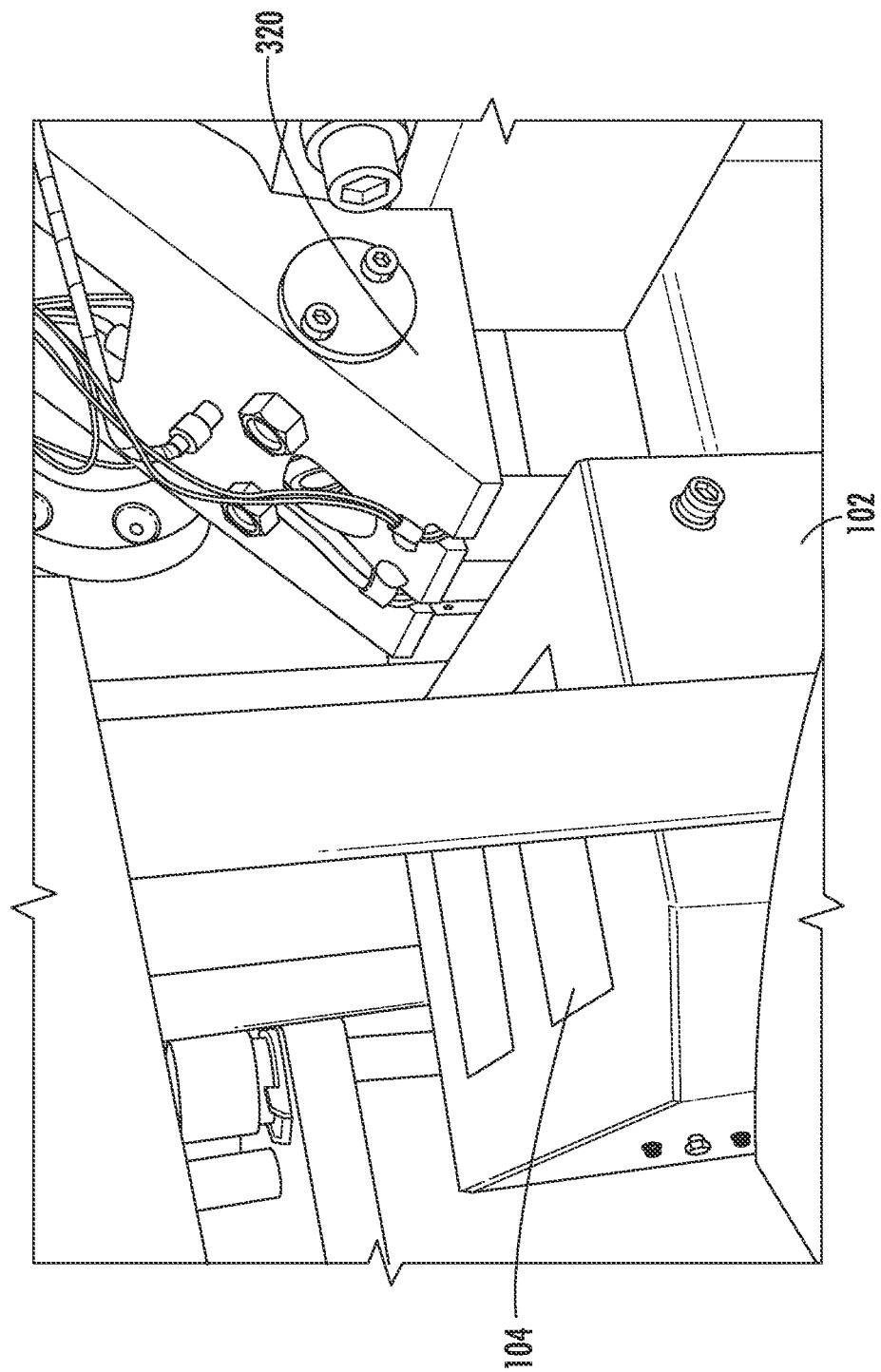
Figure 17:
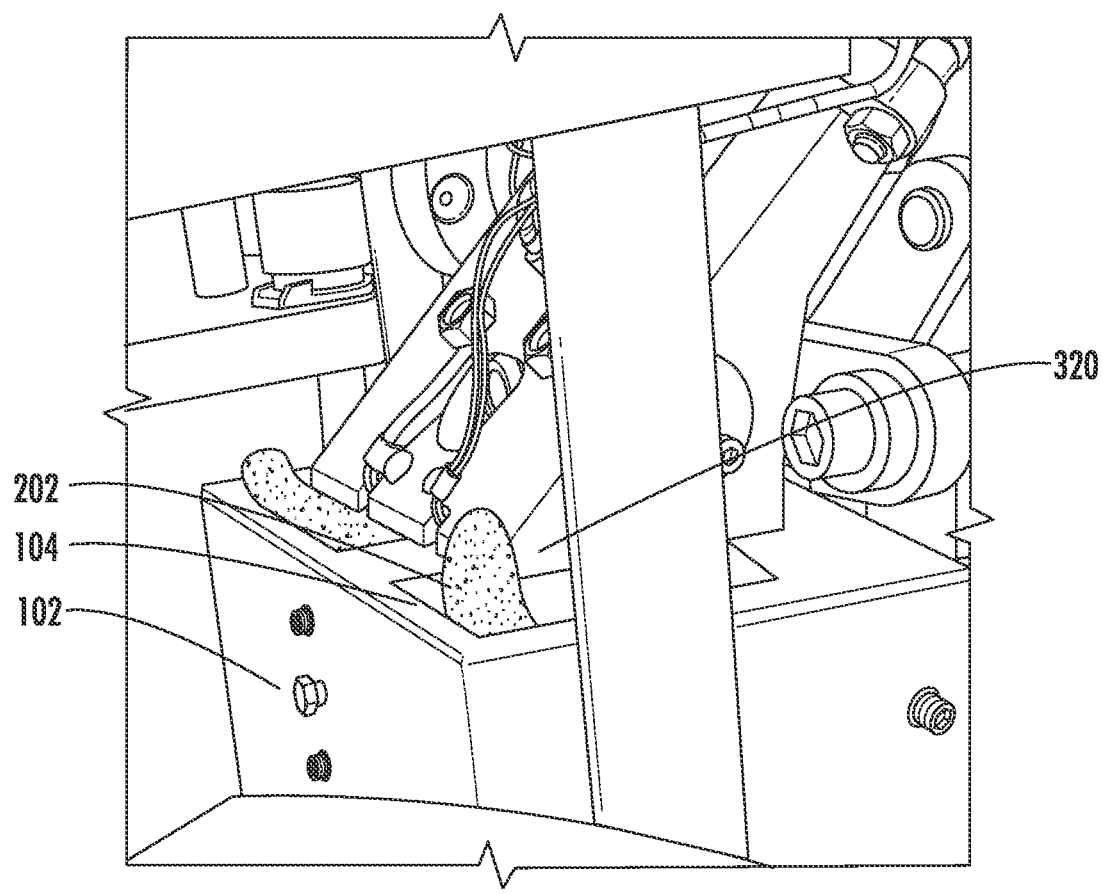

As illustrated in FIG. 16, the head 320 associated with the inner block carousel 100 is aligned with an inner block mold 102. The head 320 is then moved over the pair of inner block mold cavities 104 to deposit the composite material 202, as illustrated in FIG. 17.

Figure 18:
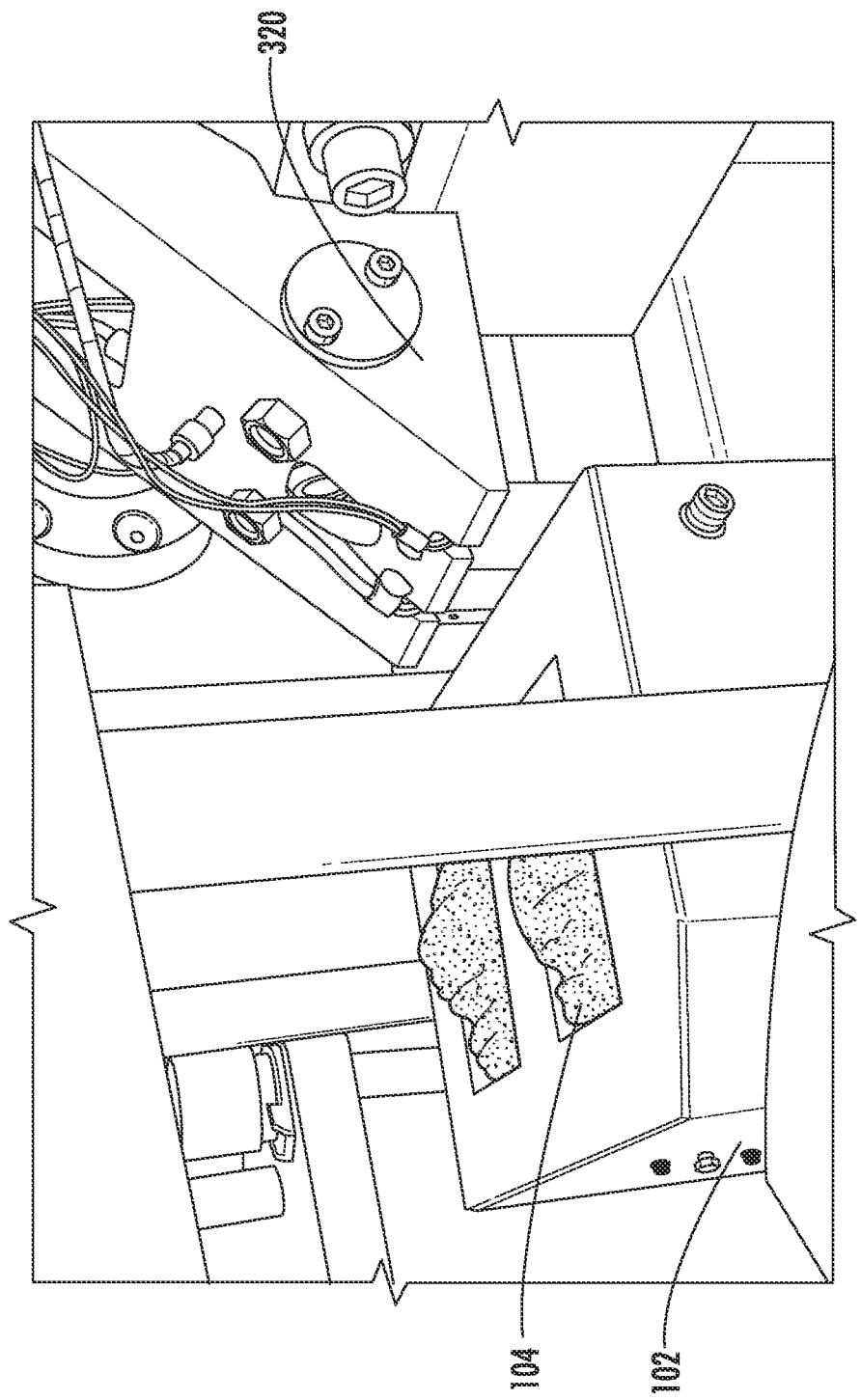

After the composite material has been deposited, then the head 320 is moved away from the inner block mold 102, as illustrated in FIG. 18. The composite material 202 is now ready to be compressed as discussed above using the multi-stage compression press 200.

Figure 19:
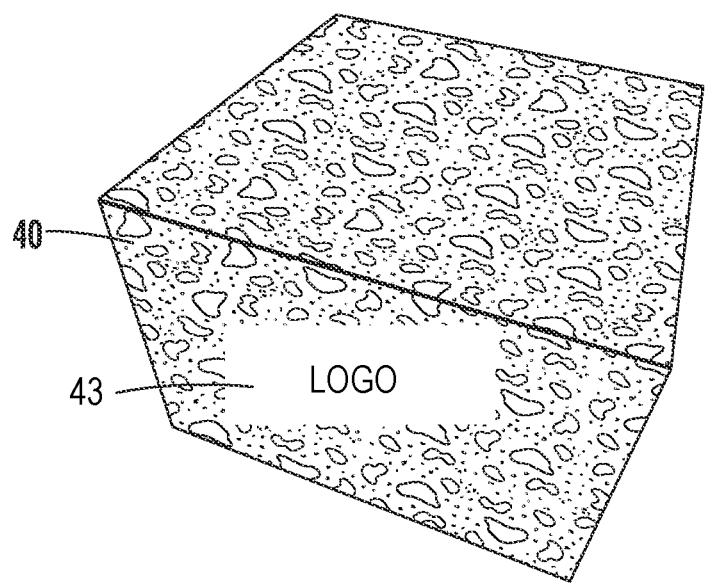
FIG. 19 is a perspective view of the double wall block having a logo formed during the compression molding process.

Referring now to FIG. 19, a double wall block 40 is configured to have a logo 43. The outer block mold cavity 124 is modified to have a raised surface in the shape of the logo 43 on one or more of the sidewalls of the cavity 124.

Figure 20:
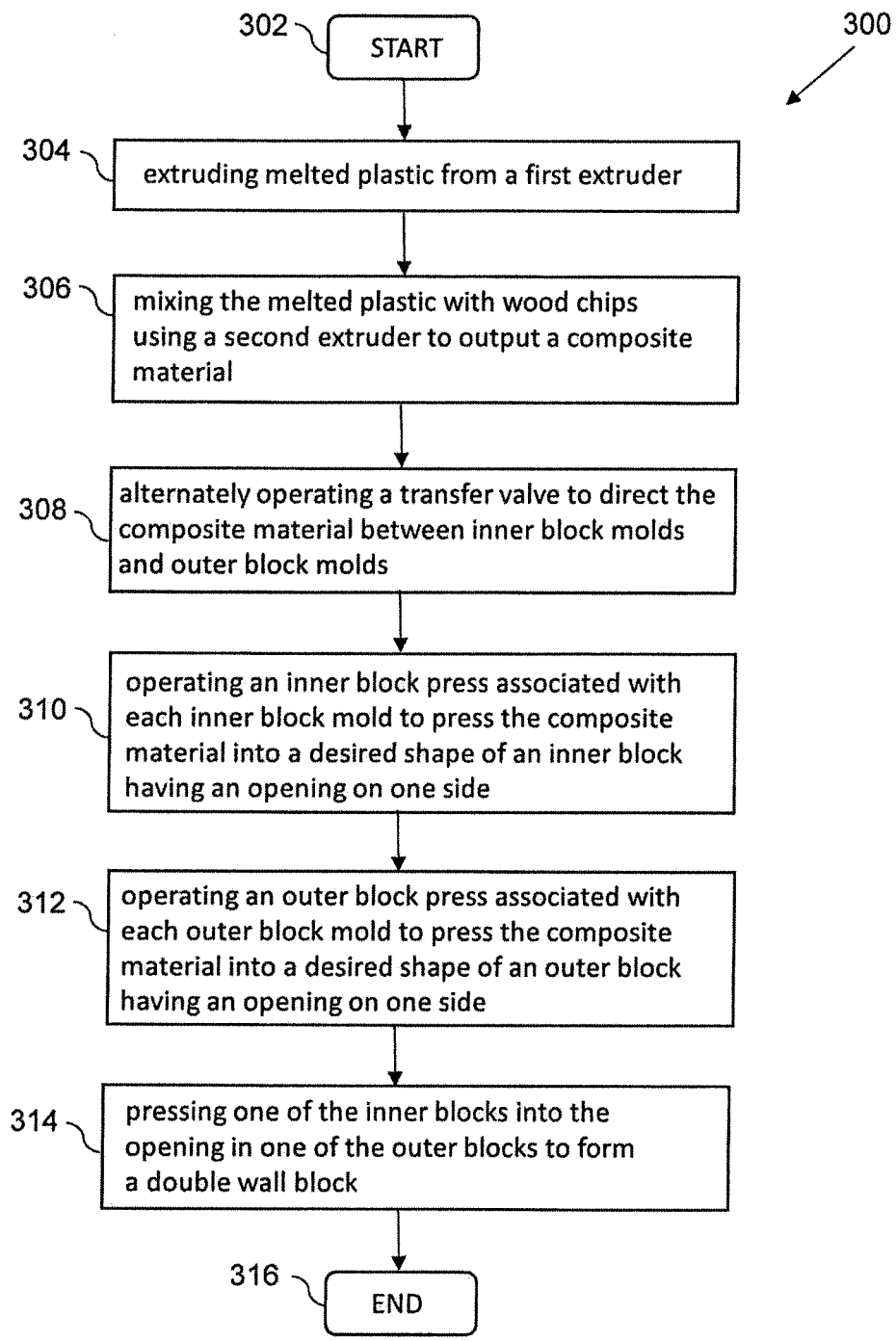
FIG. 20 is a flow diagram on operating the compression molding system illustrated in FIG. 6.

Another aspect of the disclosure is directed to a method of operating the compression molding system 50 as discussed above. Reference is now directed to the flow diagram 300 in FIG. 20. From the start (Block 302), the method includes extruding melted plastic from a first extruder 60 at Block 304, and then using a second extruder 70 downstream from the first extruder to mix the melted plastic with wood chips to output a composite material at Block 306. A transfer valve 90 at Block 308 is alternately operated to direct the composite material between inner block molds 102 and outer block molds 122.

Each inner block mold 102 has an inner block press associated therewith to press the composite material into a desired shape of an inner block 20 having an opening 22 on one side (Block 310). Each outer block mold 122 has an outer block press associated therewith to press the composite material into a desired shape of an outer block 30 having an opening 32 on one side (Block 312). A press assembly 170 is operated at Block 314 to press one of the inner blocks 20 into the opening 32 in one of the outer blocks 30 to form a double wall block 40. The method ends at Block 316.

Figure 21:
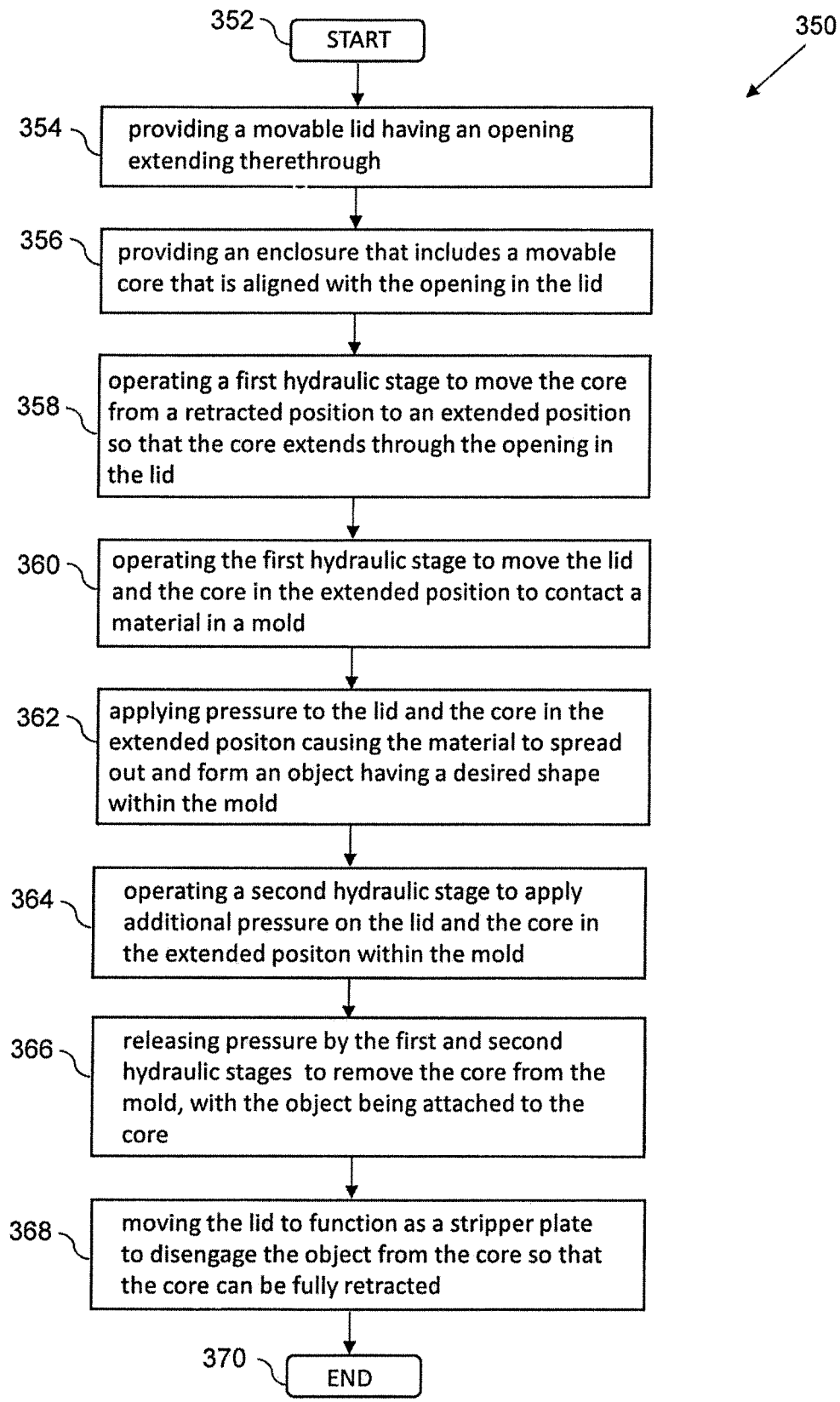
FIG. 21 is a flow diagram on operating the compression press illustrated in FIGS. 9-13.

Yet another aspect of the disclosure is directed to a method of operating the compression press 200 as discussed above. Reference is now directed to the flow diagram 350 in FIG. 21. From the start (Block 352), a movable lid 210 carried by a frame 211 and having an opening extending therethrough is provided at Block 354. An enclosure 215 carried by the frame is provided at Block 356. The enclosure 215 includes a core 220 movable between a retracted position and an extended position. The core 220 is aligned with the opening in the lid 210.

The method includes operating a first hydraulic stage 230 at Block 358 to move the core 220 from the retracted position to the extended position, with the core 220 in the extended position extending through the opening in the lid 210. The first hydraulic stage 230 then moves the lid 210 and the core 220 in the extended position at Block 360 to contact a mold 102 having a cavity 104 with material 202 deposited therein.

Pressure is applied at Block 362 by the first hydraulic stage 230 to the lid 210 and the core 220 in the extended position within the cavity 104 causing the material 202 to spread out and form an object 20 having a desired shape within the mold 102. The method further includes operating a second hydraulic stage 240 at Block 364 to apply additional pressure on the lid 210 and the core 220 in the extended position within the cavity 104.

Pressure is released by the first and second hydraulic stages 230, 240 at Block 366 to remove the core 220 from the mold cavity 104. As the core 220 is removed, the object 20 is also removed. To remove the object 20 from the core 220, the lid 210 functions as a stripper plate at Block 368 to disengage the object 20 from the core 220 so that the core can be fully retracted. The method ends at Block 370.

Many modifications and other embodiments will come to the mind of one skilled in the art having the benefit of the teachings presented in the foregoing descriptions and the associated drawings. For example, the above described compression molding system 50 with the compression press 200 may be modified to form other types of compression molded parts. Other types of compression molded parts may take the form of a more durable board for use in pallets, for example.

In this example, a board is placed in a mold. The board may not be uniform in size. For instance, the width of the board may vary from 4 inches to 3 inches. The board is elevated in the mold so that a composite material is compressed around the board within the mold. The composite material may have a ratio of about 50% plastic and about 50% wood. The end result is a laminated board that is uniform in dimensions.

Therefore, it is understood that the foregoing is not to be limited to the example embodiments, and that modifications and other embodiments are intended to be included within the scope of the appended claims.

The invention claimed is:

1. A compression molding system comprising:
   a first extruder configured to output melted plastic;
   a second extruder downstream from said first extruder and configured to mix the melted plastic with wood chips to output a composite material;
   a transfer valve downstream from said second extruder, wherein the transfer valve alternately switches between an inner block output and an outer block output, so as to direct the composite material to a single one of these outputs at any time;
   at least one inner block assembly comprising:
      at least one inner block mold to receive the composite material from the inner block output associated with said transfer valve, and
      at least one inner block press aligned with said at least one inner block mold, and configured to press the composite material in the at least one inner block mold into a desired shape of at least one inner block having an opening on one side;

at least one outer block assembly comprising:
  at least one outer block mold to receive the composite material from the outer block output associated with said transfer valve, and
  at least one outer block press aligned with said at least one outer block mold, and configured to press the composite material in the at least one outer block mold into a desired shape of at least one outer block having an opening on one side; and
a press assembly downstream from said at least one inner and outer block assemblies, and configured to press one of the at least one inner blocks into the opening in one of the at least one outer blocks to form a double wall block;
a robot arm positioned between said inner and outer block mold assemblies, and configured to alternately grab the at least one inner block and the at least one outer block as they exit the at least one inner and outer block molds;
an inner block conveyor positioned between said robot arm and said press assembly, and configured to receive the at least one inner block from said robot arm; and
an outer block conveyor adjacent said inner block conveyor and positioned between said robot arm and said press assembly, and configured to receive the at least one outer block from said robot arm,
wherein:
  the inner block output directs the composite material to the at least one inner block mold and the outer block output directs the composite material to the at least one outer block mold; and
  said press assembly is configured to receive the at least one inner block and the at least one outer block from said inner and outer block conveyors.

2. The compression molding system according to claim 1 further comprising:
an inner block carousel, wherein said at least one inner block assembly comprises a plurality of inner block assemblies spaced apart on said inner block carousel; and
an outer block carousel, wherein said at least one outer block assembly comprises a plurality of outer block assemblies spaced apart on said outer block carousel;
said inner and outer block carousels are configured to rotate, with the composite material alternately being deposited into the at least one inner and outer block molds as they become available on their respective inner and outer block carousels.

3. The compression molding system according to claim 1 further comprising:
an inner block coolant system configured to circulate a coolant through each inner block mold when the composite material therein is under pressure by the at least one inner block press associated therewith; and
an outer block coolant system configured to circulate a coolant through each outer block mold when the composite material therein is under pressure by the at least one outer block press associated therewith.

4. The compression molding system according to claim 3 wherein cooling the inner and outer block molds while under pressure allows the composite material to stabilize in order for the inner and outer blocks to be removed from their respective inner and outer block molds without being soft and sagging.

5. The compression molding system according to claim 1 further comprising a first chilled sprayer adjacent said inner and outer block conveyors, and configured to cool the at least one inner and outer blocks as they travel on the respective inner and outer block conveyors to said press assembly.

6. The compression molding system according to claim 5, further comprising:
a second chilled sprayer adjacent said inner and outer block conveyors, and configured to cool the double wall block as it travels on said conveyors.

7. The compression molding system according to claim 6 wherein a temperature of the outer block in the double wall block is warmer than a temperature of the inner block in the double wall block, and as the outer block cools, the outer block shrinks onto the inner block to create a tight seal at an interface between the inner and outer blocks.

8. The compression molding system according to claim 1 wherein the composite material is about 50% plastic and about 50% wood.

9. The compression molding system according to claim 1 wherein the double wall block is formed with a hollow center.

10. The compression molding system according to claim 9 wherein the inner block is configured as a 5-sided block with the opening on a remaining side, and the outer block is configured as a 5-sided block with the opening on a remaining side, with the inner and outer blocks being oriented so that the opening of the inner block is facing the opening of the outer block.

11. A compression molding system comprising:
a first extruder configured to output melted plastic;
a second extruder downstream from said first extruder and configured to mix the melted plastic with wood chips to output a composite material;
a transfer valve downstream from said second extruder and configured to alternately direct the composite material between an inner block output and an outer block output associated with said transfer valve;
at least one inner block assembly comprising:
  at least one inner block mold to receive the composite material from the inner block output associated with said transfer valve, and
  at least one inner block press aligned with said at least one inner block mold, and configured to press the composite material in the at least one inner block mold into a desired shape of at least one inner block having an opening on one side;
at least one outer block assembly comprising:
  at least one outer block mold to receive the composite material from the outer block output associated with said transfer valve, and
  at least one outer block press aligned with said at least one inner block mold, and configured to press the composite material in the at least one outer block mold into a desired shape of at least one outer block having an opening on one side; and
a press assembly downstream from said at least one inner and outer block assemblies, and configured to press one of the at least one inner blocks into the opening in one of the at least one outer blocks to form a double wall block;
a robot arm positioned between said inner and outer block mold assemblies, and configured to alternately grab the at least one inner block and the at least one outer block as they exit the at least one inner and outer block molds;
an inner block conveyor positioned between said robot arm and said press assembly, and configured to receive the at least one inner block from said robot arm;

an outer block conveyor adjacent said inner block conveyor and positioned between said robot arm and said press assembly, and configured to receive the at least one outer block from said robot arm; and said press assembly is configured to receive the at least one inner block and the at least one outer block from said inner and outer block conveyors.

12. The compression molding system according to claim 11 further comprising:

an inner block carousel, wherein said at least one inner block assembly comprises a plurality of inner block assemblies spaced apart on said inner block carousel; and an outer block carousel, wherein said at least one outer block assembly comprises a plurality of outer block assemblies spaced apart on said outer block carousel;

said inner and outer block carousels are configured to rotate, with the composite material alternately being deposited into the at least one inner and outer block molds as they become available on their respective inner and outer block carousels.

13. The compression molding system according to claim 11 further comprising:

an inner block coolant system configured to circulate a coolant through each inner block mold when the composite material therein is under pressure by the at least one inner block press associated therewith; and an outer block coolant system configured to circulate a coolant through each outer block mold when the composite material therein is under pressure by the at least one outer block press associated therewith.

14. The compression molding system according to claim 13 wherein cooling the inner and outer block molds while under pressure allows the composite material to stabilize in order for the inner and outer blocks to be removed from their respective inner and outer block molds without being soft and sagging.

15. The compression molding system according to claim 11 further comprising:

a first chilled sprayer adjacent said inner and outer block conveyors, and configured to cool the at least one inner and outer blocks as they travel on the respective inner and outer block conveyors to said press assembly; and a second chilled sprayer adjacent said inner and outer block conveyors, and configured to cool the double wall block as it travels on said conveyors.

16. The compression molding system according to claim 15 wherein a temperature of the outer block in the double wall block is warmer than a temperature of the inner block in the double wall block, and as the outer block cools, the outer block shrinks onto the inner block to create a tight seal at an interface between the inner and outer blocks.

17. The compression molding system according to claim 11 wherein the composite material is about 50% plastic and about 50% wood.

18. The compression molding system according to claim 11 wherein the double wall block is formed with a hollow center.

19. The compression molding system according to claim 18 wherein the inner block is configured as a 5-sided block with the opening on a remaining side, and the outer block is configured as a 5-sided block with the opening on a remaining side, with the inner and outer blocks being oriented so that the opening of the inner block is facing the opening of the outer block.

* * * * *